United States Patent
Phillips, II et al.

(10) Patent No.: US 9,021,927 B2
(45) Date of Patent: *May 5, 2015

(54) PIPE LATHE AND SUBASSEMBLY THEREFOR

(71) Applicant: Furmanite Worldwide, Inc., Houston, TX (US)

(72) Inventors: Roger D. Phillips, II, Kershaw, SC (US); Linsey Gaston Whiteside, Blackstock, SC (US)

(73) Assignee: Furmanite Worldwide, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/057,578

(22) Filed: Oct. 18, 2013

(65) Prior Publication Data

US 2014/0041492 A1 Feb. 13, 2014

Related U.S. Application Data

(63) Continuation of application No. 12/823,342, filed on Jun. 25, 2010, now Pat. No. 8,584,558.

(51) Int. Cl.
| | |
|---|---|
| *B23B 5/14* | (2006.01) |
| *B23B 5/16* | (2006.01) |
| *B23B 3/26* | (2006.01) |

(52) U.S. Cl.
CPC ........... *B23B 5/161* (2013.01); *Y10T 82/16442* (2015.01); *Y10T 82/22* (2015.01); *Y10T 82/2529* (2015.01); *B23B 3/26* (2013.01)

(58) Field of Classification Search
USPC .................. 82/113, 70.2, 72, 83, 88, 101, 46; 279/141
See application file for complete search history.

(56) References Cited

U.S. PATENT DOCUMENTS

| | | |
|---|---|---|
| 3,744,356 A | 7/1973 | Slator et al. |
| 3,813,968 A | 6/1974 | Thomas |
| 4,397,202 A | 8/1983 | Mayfield et al. |

(Continued)

FOREIGN PATENT DOCUMENTS

| | | | |
|---|---|---|---|
| DE | 2439852 A | * | 3/1976 |
| JP | 2003117720 A | | 4/2003 |

OTHER PUBLICATIONS

Tri Tool Inc., 600 Series Split Frame Clamshells, pp. 1-20, http://www.tritool.com/docs/brochures/odcat.pdf.

(Continued)

*Primary Examiner* — Daniel Howell
*Assistant Examiner* — Nicole N Ramos
(74) *Attorney, Agent, or Firm* — Nathan Calvert; Russell Culbertson; The Culbertson Group, PC

(57) ABSTRACT

A subassembly is provided for a pipe lathe. The pipe lathe includes a segmented base ring and a drive gear assembly. The segmented base ring is structured to be removably coupled to a work piece having a perimeter. The subassembly includes a gear ring, a separate ring member, at least one tool mounting portion disposed on the separate ring member. The separate ring member is fastenable to the gear ring, in order that the separate ring member rotates with the gear ring but not independently with respect thereto. A number of tool assemblies mount to the tool mounting portion to machine the work piece. The gear ring includes a plurality of teeth, which cooperate with the drive gear assembly of the pipe lathe to rotate the subassembly about the perimeter of the work piece.

14 Claims, 13 Drawing Sheets

(56) References Cited

U.S. PATENT DOCUMENTS

| | | | |
|---|---|---|---|
| 4,402,136 A * | 9/1983 | Rast | 30/101 |
| 4,624,052 A | 11/1986 | Garcia et al. | |
| 4,739,685 A | 4/1988 | Ricci | |
| 4,754,672 A * | 7/1988 | VanderPol | 82/113 |
| 4,762,038 A | 8/1988 | Olson | |
| 4,770,074 A * | 9/1988 | Kwech | 82/113 |
| 4,813,314 A | 3/1989 | Kwech | |
| 4,939,964 A | 7/1990 | Ricci | |
| 5,549,024 A | 8/1996 | Ricci | |
| 6,619,164 B1 | 9/2003 | Ricci et al. | |
| 7,000,510 B1 | 2/2006 | Place et al. | |
| 8,051,753 B2 | 11/2011 | Ricci et al. | |
| 2010/0162860 A1 | 7/2010 | Hall et al. | |

OTHER PUBLICATIONS

Tri Tool Inc., Split Frame Clamshells, pp. 1-16, http://tritool.eu/docs/brochures/odcat.pdf.

* cited by examiner

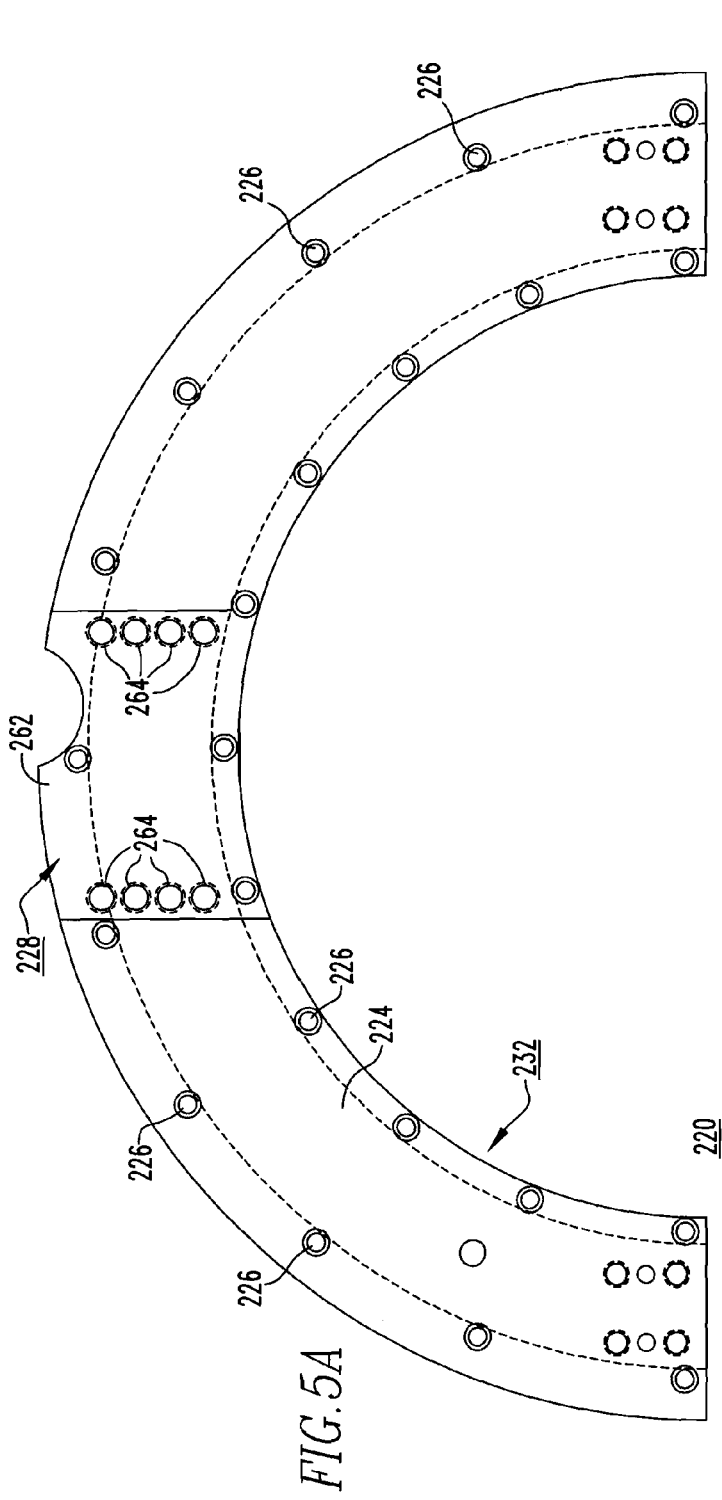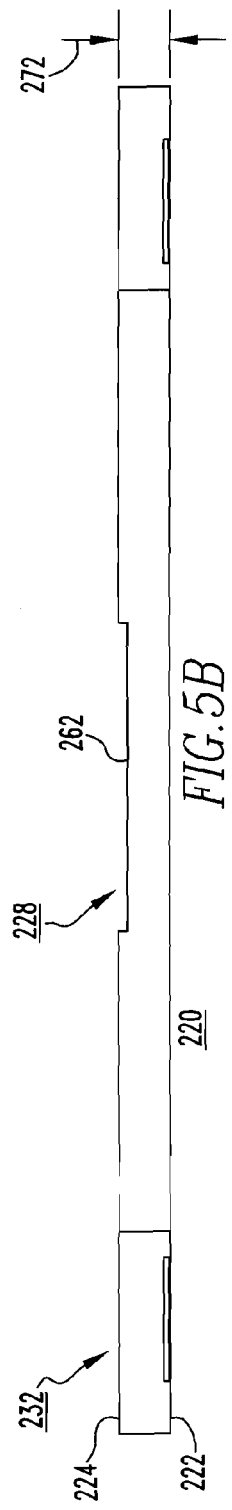

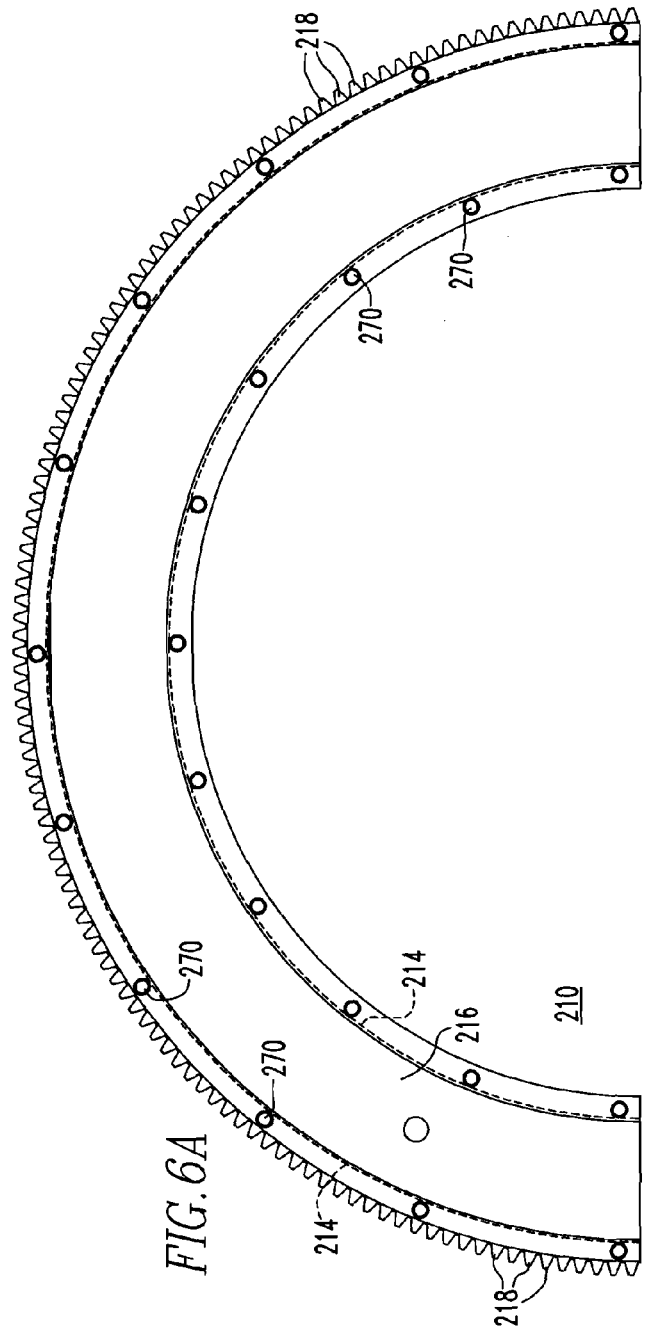
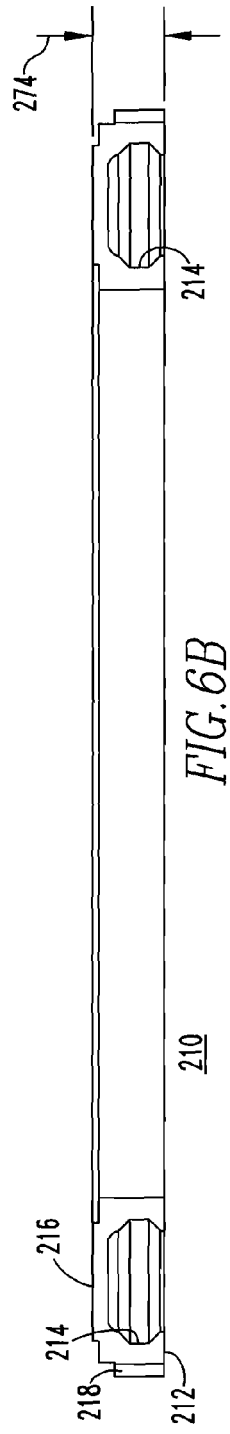

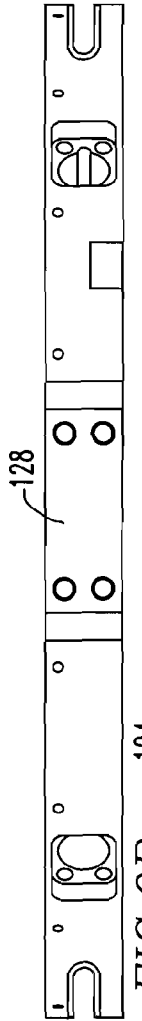
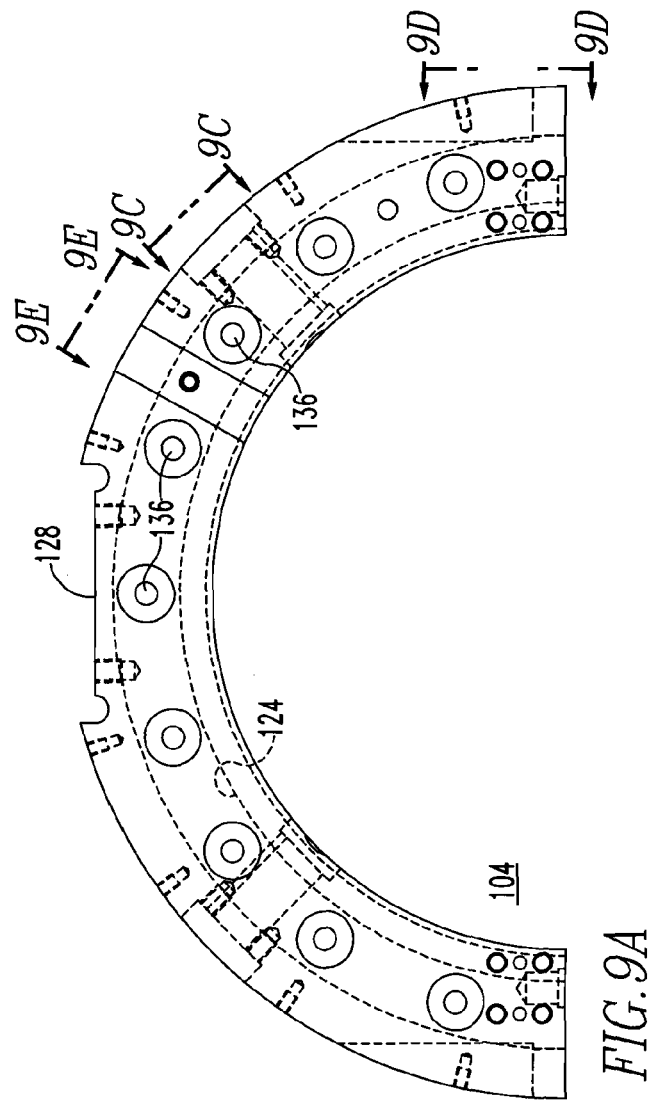
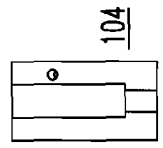
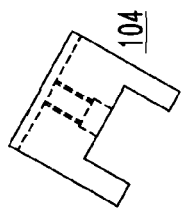
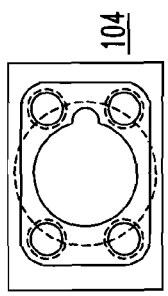

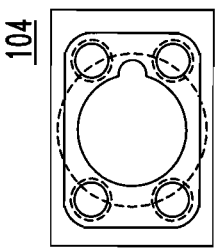
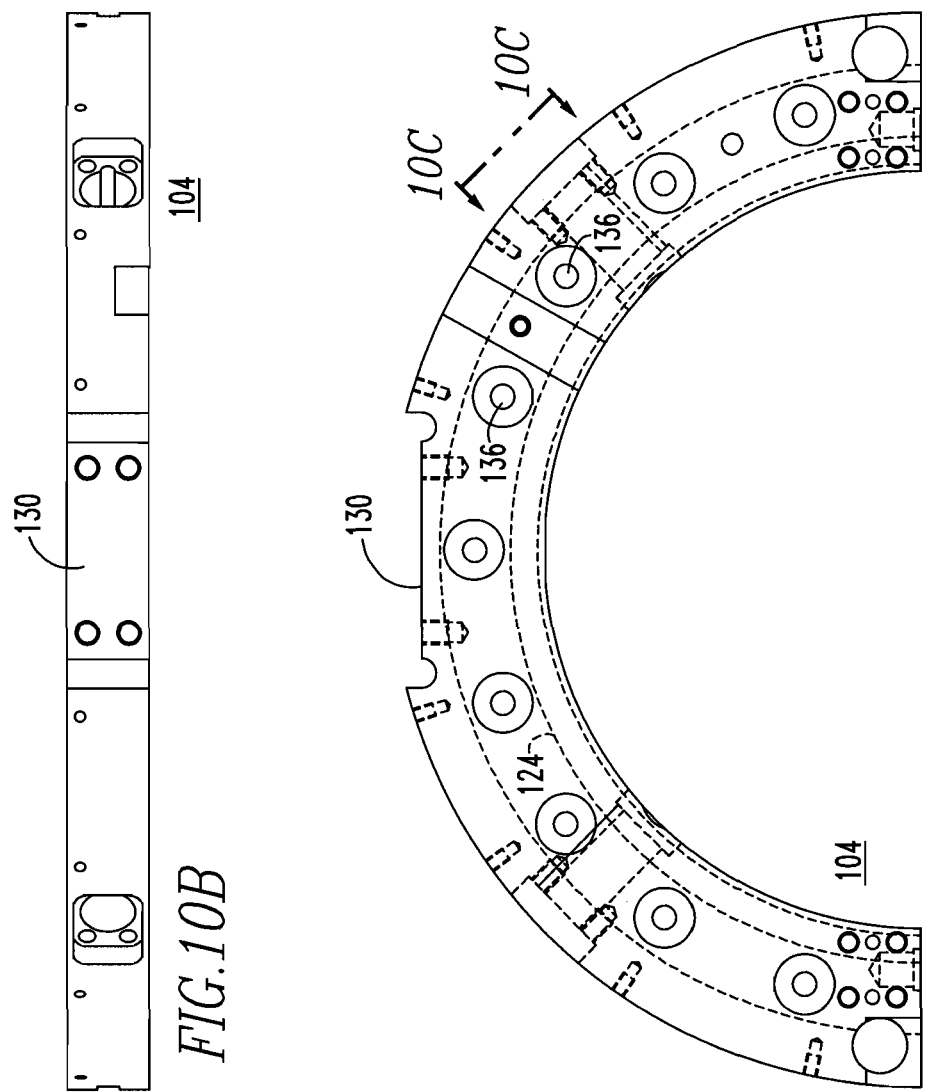

PIPE LATHE AND SUBASSEMBLY THEREFOR

CROSS-REFERENCE TO RELATED APPLICATIONS

This application is a continuation of U.S. patent application Ser. No. 12/823,342, entitled "PIPE LATHE AND SUBASSEMBLY THEREFORE" filed Jun. 25, 2010. The Applicants hereby claim the benefit of the above-identified application under 35 U.S.C. §120. The entire content the identified parent application is incorporated herein by reference.

FIELD OF THE INVENTION

The invention relates generally to tooling for machining a work piece and, more particularly to pipe lathes. The invention also relates to subassemblies for pipe lathes.

BACKGROUND

Pipe lathes, also commonly referred to as split frame machines or clam shells, are generally well known, for example, in the power and petroleum industries.

An example of a pipe lathe 2 is shown in FIGS. 1 and 2. As shown in FIG. 2, the pipe lathe 2 is typically attached to a work piece 4 (e.g., without limitation, a pipe (shown in phantom line drawing in FIG. 2); a valve; a flange)), which has a round or circular perimeter and which needs to be cut, beveled, faced, bored or otherwise machined, for example, as part of a repair, new construction or maintenance service. The pipe lathe 2 typically includes two or more sections 6 and 8, which are segmented (e.g., split into two or more pieces) and designed to be coupled (e.g., bolted or otherwise suitably fastened) together to form a complete assembly 2 around the work piece 4 to be machined. Specifically, the first section is a stationary ring portion, or base 6, which clamps to the work piece 4 using feet or pads (generally indicated by reference numeral 10). The second section is a rotating portion 8 having a main gear ring 12 and being structured to be movably coupled to the base 6. The main gear ring 12 is a manufactured component that includes gear teeth 14, bearing interface grooves 16 (partially shown in hidden line drawing in FIG. 1), and tool mounting features 18 all incorporated into a single relatively thick and complex monolithic assembly, which makes up the rotating portion 8 of the pipe lathe 2. In the example of FIG. 2, a cutting tool 20 is shown in simplified form in phantom line drawing mounted on one of the tool mounting features 18.

In operation, the assembled pipe lathe 2 can be driven by a pneumatic, hydraulic or electric motor 22 (shown in simplified form in FIG. 1) or other suitable drive mechanism (not shown), that drives a number of gears 24 (one gear 24 is partially shown in hidden line drawing in FIG. 1) which, in turn, interface with the teeth 14 (FIG. 1) of the main gear ring 12 to turn the main gear ring 12 with respect to the base 6. Bearing assemblies 26 (FIG. 1) are coupled to the base 6 and cooperate with the aforementioned bearing interface grooves 16 of the main gear ring 12, thereby movably coupling the rotating portion 8 to the base 6. As the rotating portion 8 is driven by the motor 22 it rotates about the perimeter of the work piece 4, as indicated generally by arrow 28 of FIG. 2. As it does so, the desired tool (see, for example, cutting tool 20 shown in simplified form in phantom line drawing in FIG. 2) performs the desired machining operation (e.g., without limitation, cutting operation) on the work piece 4. It will be appreciated that, while the pipe lathe 2 is shown in FIG. 2 as being mounted on the exterior perimeter of the work piece 4, that it is also known to employ such a pipe lathe 2 on the interior circumference or perimeter of the work piece 4.

There is a need for improvement in pipe lathes, and in subassemblies therefore.

SUMMARY

These needs and others are met by embodiments of the disclosed concept, which are directed to a pipe lathe having a subassembly with a gear ring and separate ring member as opposed to a relatively thick and complex single monolithic movable gear component. Among other benefits, the disclosed subassembly reduces weight and provides a modular system that also reduces repair time and enables changes such as, for example, upgrades and job-specific modifications to be made relatively quickly and easily.

As one aspect of the disclosed concept, a subassembly is provided for a pipe lathe. The pipe lathe includes a segmented base ring, a drive gear assembly coupled to the segmented base ring, and a plurality of bearing assemblies. The segmented base ring is structured to be removably coupled to a work piece having a perimeter. The subassembly comprises: a gear ring including a first side having a bearing slot, a second side disposed opposite the first side, and a plurality of teeth, the bearing slot being structured to receive at least a portion of each of the bearing assemblies; a separate ring member comprising a first side facing the second side of the gear ring, a second side disposed opposite the first side of the separate ring member, and a plurality of apertures; at least one tool mounting portion disposed on the second side of the separate ring member, at least one tool mounting portion being structured to mount a number of tool assemblies for machining the work piece; and a plurality of fasteners extending through the apertures of the separate ring member and fastening the separate ring member to the gear ring, in order that the separate ring member rotates with the gear ring but not independently with respect thereto. The teeth of the gear ring are structured to cooperate with the drive gear assembly of the pipe lathe to rotate the subassembly about the perimeter of the work piece.

The separate ring member may further comprise a first segment, a second segment, and number of coupling mechanisms. The first segment may be structured to extend around or within a first portion of the perimeter of the work piece, and the second segment may be structured to extend around or within a second portion of the perimeter of the work piece generally opposite from the first portion. The coupling mechanisms may couple the first segment to the second segment. The separate ring member may have a first thickness measured by the distance between the first side of the separate ring member and the second side of the separate ring member, and the gear ring may have a second thickness measured by the distance between the first side of the gear ring and the second side of the gear ring, wherein the first thickness of the separate ring member is less than the second thickness of the gear ring.

As another aspect of the disclosed concept, a pipe lathe is provided for machining a work piece having a perimeter. The pipe lathe comprises: a segmented base ring structured to be removably coupled to the work piece; a drive gear assembly coupled to the segmented base ring; a plurality of bearing assemblies; and a subassembly comprising: a gear ring including a first side having a bearing slot, a second side disposed opposite the first side, and a plurality of teeth, the bearing slot receiving at least a portion of each of the bearing assemblies, a separate ring member comprising a first side facing the second side of the gear ring, a second side disposed opposite the first side of the separate ring member, and a plurality of apertures, at least one tool mounting portion disposed on the second side of the separate ring member, the at least one tool mounting portion being structured to mount a number of tool assemblies for machining the work piece, and a plurality of fasteners extending through the apertures of the separate ring member and fastening the separate ring member to the gear ring, in order that the separate ring member rotates with the gear ring but not independently with respect thereto. The teeth of the gear ring cooperate with the drive gear assembly of the pipe lathe to rotate the subassembly about the perimeter of the work piece.

The segmented base ring may comprise an annular recess, a spacer ring and a generally planar portion. The drive gear assembly may be mounted to the generally planar portion, and the spacer ring may be disposed in the annular recess between the segmented base ring and the first side of the gear ring of the subassembly.

BRIEF DESCRIPTION OF THE DRAWINGS

A full understanding of the disclosed invention can be gained from the following description of the preferred embodiments when read in conjunction with the accompanying drawings.

FIGS. 5A and 5B are top plan and side elevation views, respectively, of one segment of the separate ring member of the pipe lathe of FIG. 4.

FIGS. 6A and 6B are top plan and side elevation views, respectively, of one segment of the gear ring of the pipe lathe of FIG. 4.

FIGS. 9A and 9B are top plan and end elevation views, respectively, of one half of the base ring segment of FIGS. 7A, 7B and 7C, showing hidden features in hidden line drawing.

FIG. 9C is a detail view of section 9C-9C of FIG. 9A.

FIG. 9D is a detail view of section 9D-9D of FIG. 9A.

FIG. 9E is a detail view of section 9E-9E of FIG. 9A.

FIGS. 10A and 10B are top plan and end elevation views, respectively, of the base ring segment of FIGS. 8A, 8B and 8C, showing hidden features in hidden line drawing.

FIG. 10C is a detail view of section 10C-10C of FIG. 10A.

DETAILED DESCRIPTION OF PREFERRED EMBODIMENTS

Figure 1:
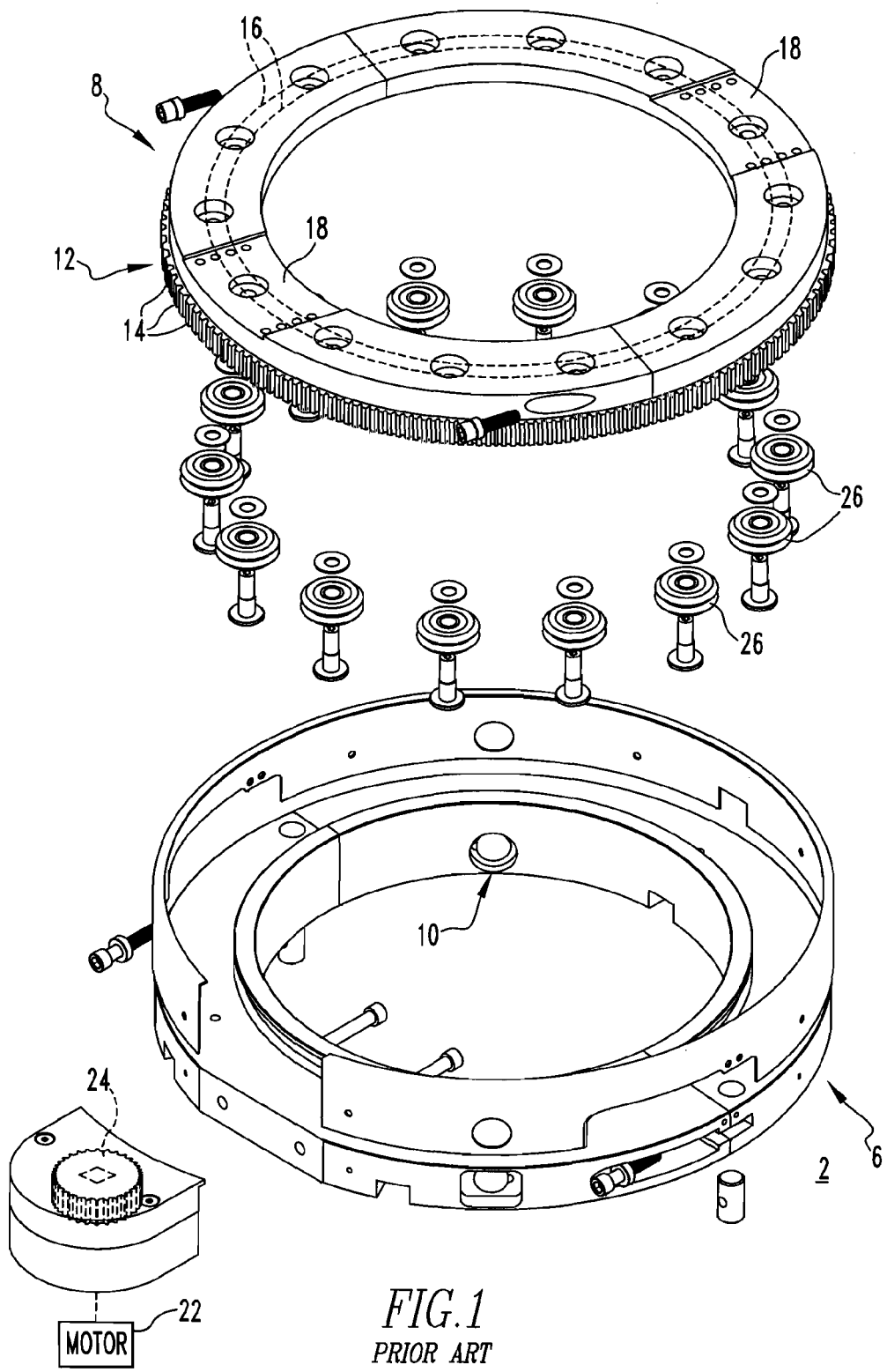
FIG. 1 is an exploded isometric view of a prior art pipe lathe.

For purposes of illustration, embodiments of the disclosed concept will be described as applied to machining the exterior perimeter of a pipe, although it will be appreciated that they could also be applied to machine any suitable portion (e.g., without limitation, interior surface or perimeter; exterior surface or perimeter) of any known or suitable work piece (e.g., without limitation, a valve; a flange) other than a pipe.

Directional phrases used herein, such as, for example, clockwise, counterclockwise, top, bottom and derivatives thereof, relate to the orientation of the elements shown in the drawings and are not limiting upon the claims unless expressly recited therein.

As employed herein, the terms "fastener" and "fastening mechanism" refer to any suitable connecting or tightening mechanism expressly including, but not limited to, screws, bolts (e.g., without limitation, carriage bolts) and the combinations of bolts and nuts (e.g., without limitation, lock nuts and wing nuts) and bolts, washers and nuts, as well as any known or suitable mechanism or structure for joining one component to another component expressly including, but not limited to, interlocking structures such as suitable projections and protrusions, which cooperate together or with recesses, openings, holes and other suitable apertures.

As employed herein, the statement that two or more parts are "coupled" together shall mean that the parts are joined together either directly or joined through one or more intermediate parts.

As employed herein, the term "number" shall mean one or an integer greater than one (i.e., a plurality).

Figure 3:
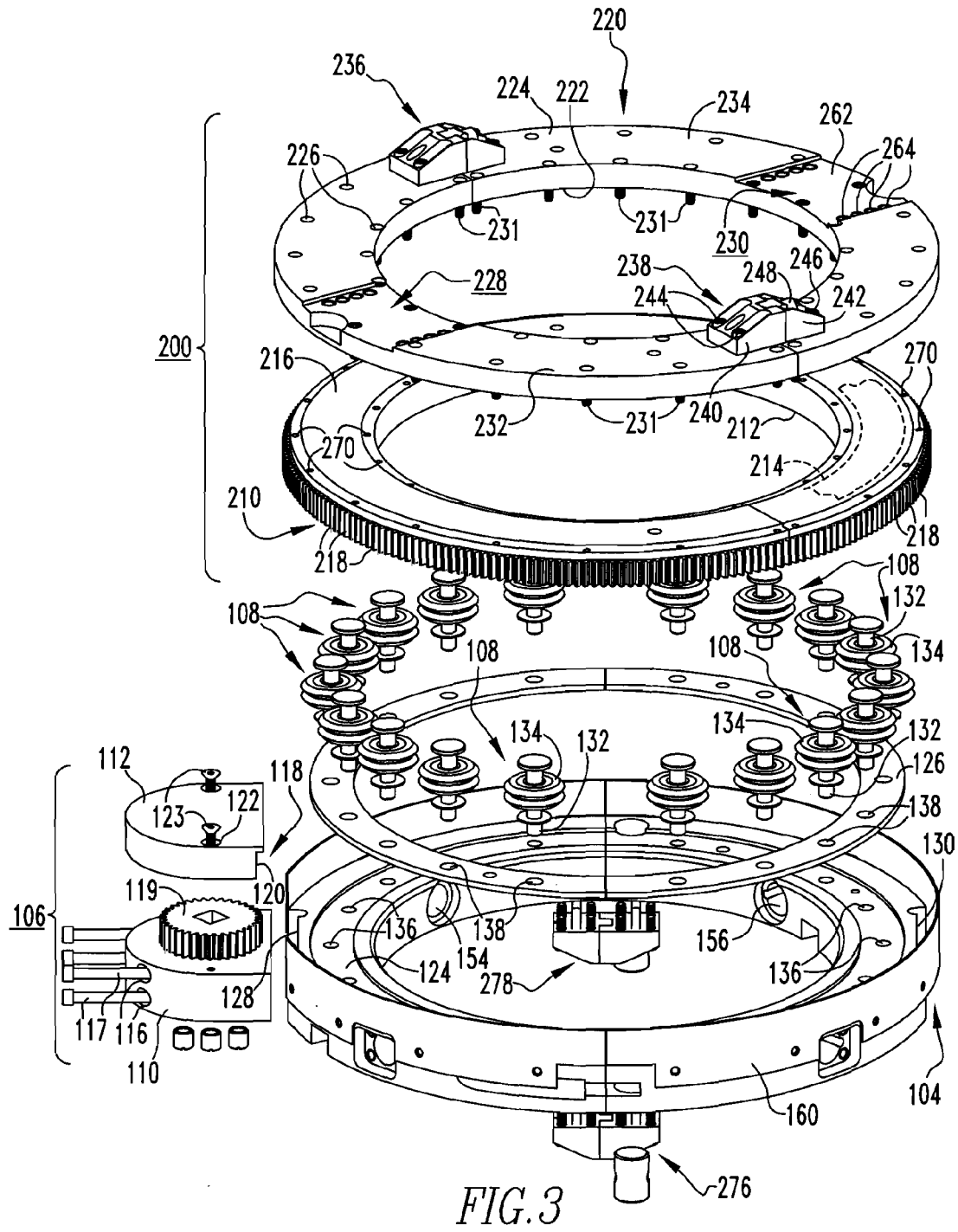
FIG. 3 is an exploded isometric view of a pipe lathe and subassembly therefore in accordance with an embodiment of the invention.
Figure 4:
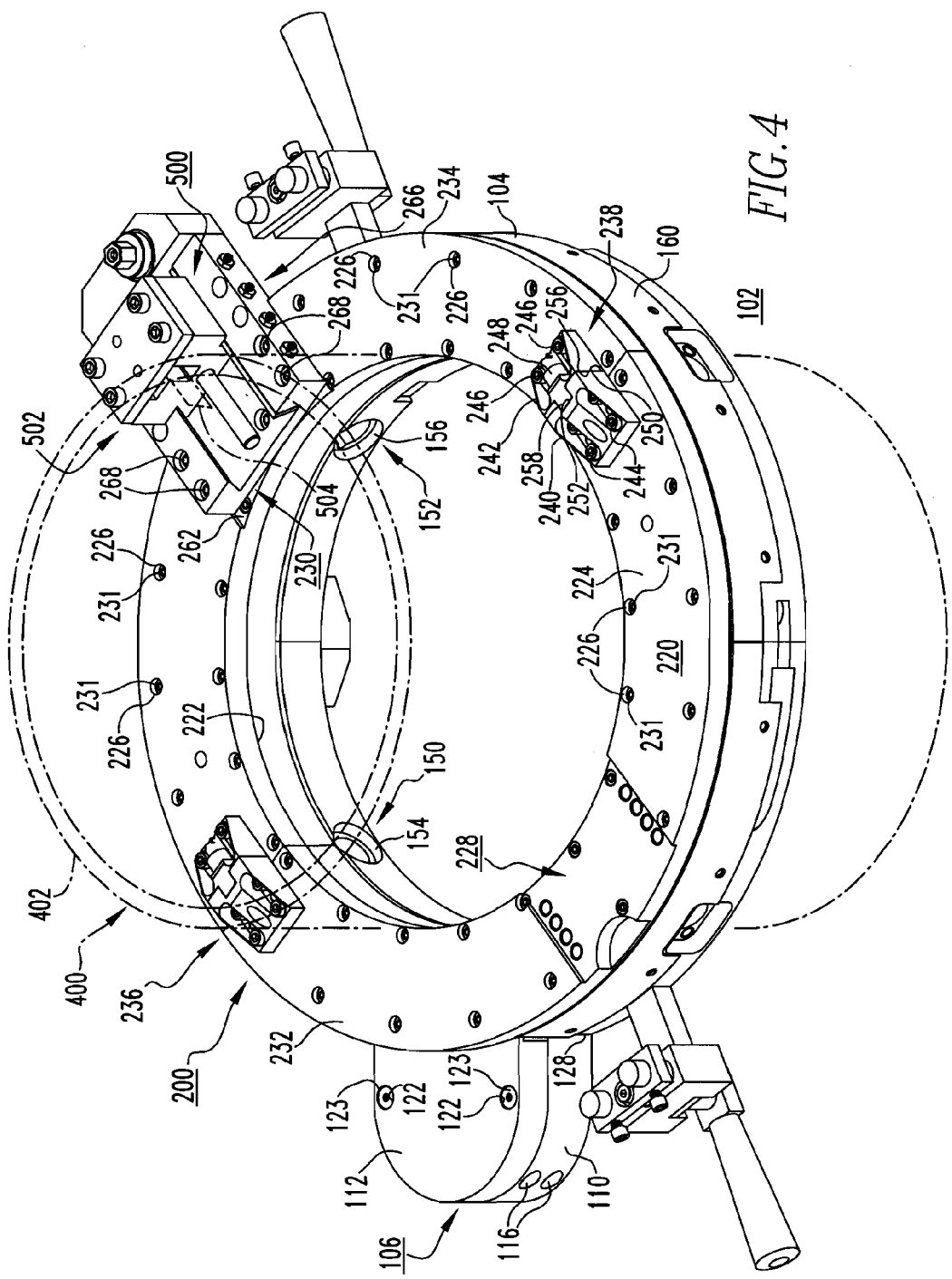
FIG. 4 is an isometric assembled view of the pipe lathe of FIG. 3.
Figure 7A:
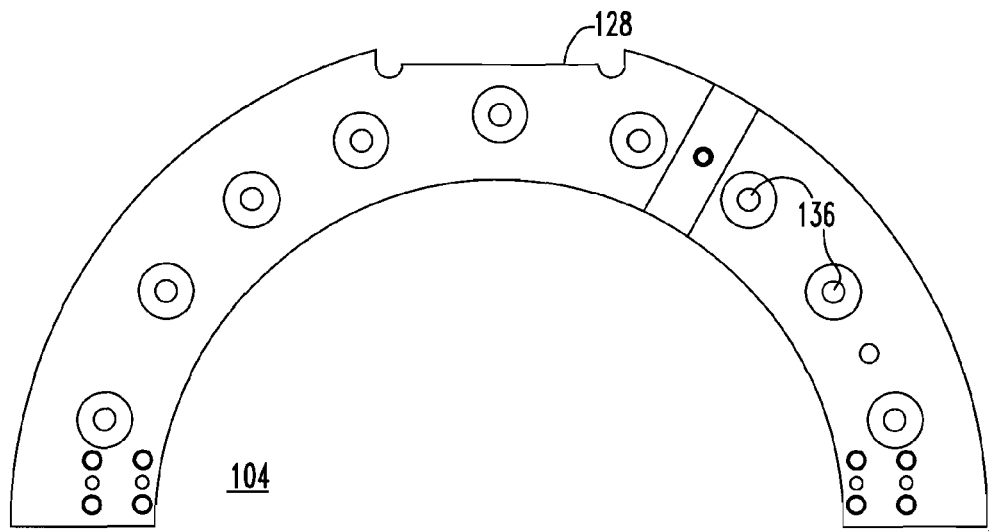
FIGS. 7A, 7B and 7C are top plan, bottom plan and end elevation views, respectively, of one segment of the base ring of the pipe lathe of FIG. 4.
Figure 7B:
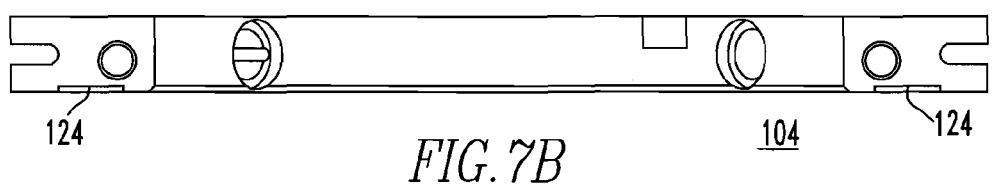
Figure 7C:
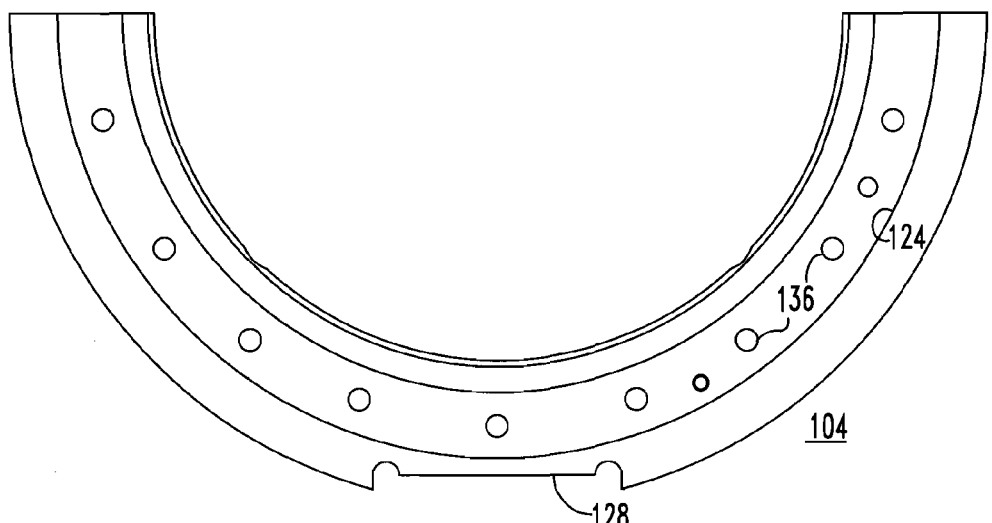
Figure 8A:
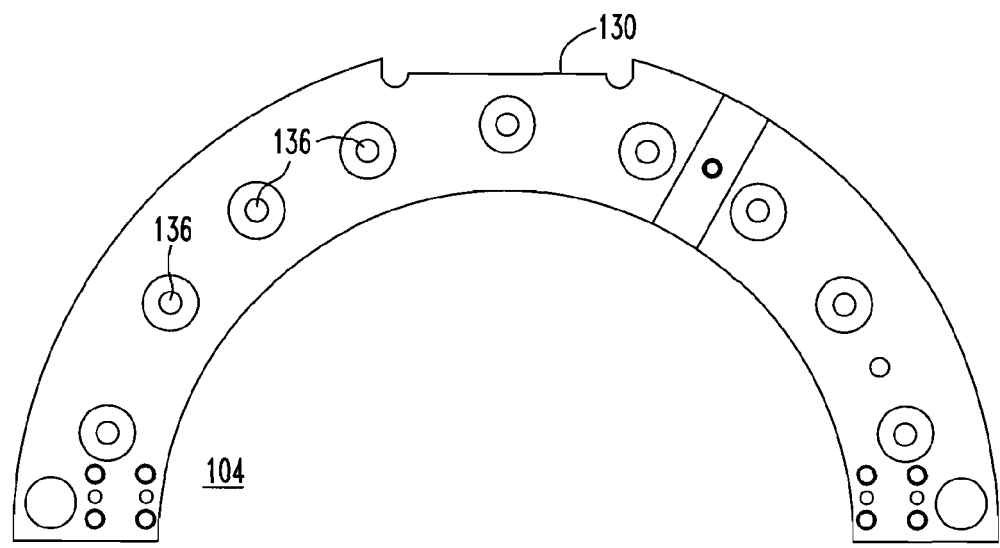
FIGS. 8A, 8B and 8C are top plan, bottom plan and end elevation views, respectively, of another segment of the base ring.
Figure 8B:
Figure 8C:
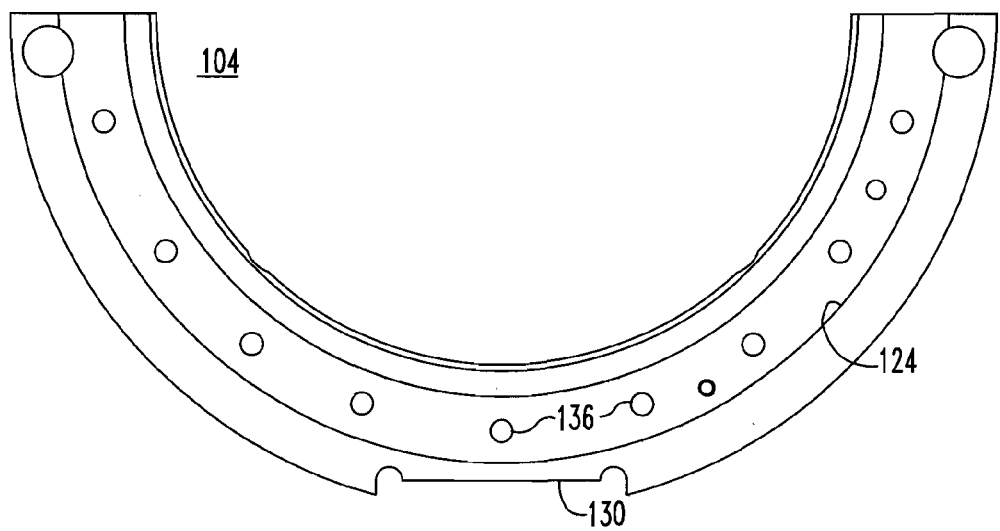

FIG. 3 shows an exploded view of a pipe lathe 102 including a subassembly 200 in accordance with the disclosed concept. The pipe lathe 102 generally includes a segmented base ring 104, a drive gear assembly 106 coupled to the segmented base ring 104, and a plurality of bearing assemblies 108. The segmented base ring 104 is structured to be removably coupled to a work piece such as, for example and without limitation, a pipe 400 (partially shown in phantom line drawing in FIG. 4). In the example of FIG. 4, the base ring 104 is secured in a stationary position on the outer perimeter 402 of the pipe 400 using a number of suitable clamping mechanisms (e.g., without limitation, mounting feet or pads generally indicated by reference numerals 150, 152), in a generally well known manner. Specifically, a portion of each mounting foot 150, 152 extends through a corresponding opening 154, 156 (see also FIG. 3), respectively, to clamp the base ring 104 in a desired, fixed position on the work piece 400.

In one non-limiting embodiment, which is shown and described solely for purposes of illustration, the subassembly 200 includes a gear ring 210 having a first side 212 with a bearing slot 214 (partially shown in hidden line drawing in FIG. 3; see also FIGS. 6A and 6B), a second side 216 disposed opposite the first side 212, and a plurality of teeth 218. The bearing slot 214 is structured to receive at least a portion of each of the bearing assemblies 108, thereby movably coupling the gear ring 210 to the aforementioned base ring 104. It will be appreciated that the bearing slot 214 is not required to be double-sided (e.g., without limitation, to receive the bearings 134 of bearing assemblies 108 therebetween), as best shown in the non-limiting example of FIG. 6B. For example and without limitation, the gear ring 210 could be sized and/or configured differently such that the bearing slot 214 would be single-sided (e.g., without limitation, one side open and the bearing assemblies 108 being biased against the single-sided bearing surface of the bearing slot 214 (not shown)), without departing from the scope of the disclosed concept.

A separate ring member 220 includes a first side 222, which faces the second side 216 of the gear ring 210, and a second side 224 disposed opposite the first side 222 of the separate ring member 220. The separate ring member 220 further includes a plurality of apertures 226, and at least one tool mounting portion 228,230 (two are shown in the non-limiting example embodiment illustrated herein) disposed on the second side 224 of the separate ring member 220. Each tool mounting portion 228,230 is structured to mount a number of tool assemblies 500 for machining the work piece 400, as generally shown in FIG. 4. The apertures 226 of the separate ring member 220 receive a plurality of fasteners 231 for fastening the separate ring member 220 to the gear ring 210. It will, therefore, be appreciated that the separate ring member 220 rotates with the gear ring 210, but not independently with respect thereto. Accordingly, the drive gear assembly 106 and, in particular, the drive gear 119 (FIG. 3) thereof, of the pipe lathe 102 cooperates with the teeth 218 of the gear ring 210 to rotate (e.g., without limitation, clockwise and/or counterclockwise from the perspective of FIGS. 3 and 4) the subassembly 200 about the perimeter 402 of the work piece 400 (e.g., without limitation, pipe), as will be described in greater detail herein below.

Continuing to refer to FIG. 3, and also to FIGS. 4-6B, it will be appreciated that the separate ring member 220 includes a plurality of segments 232,234. The separate ring member 220 of the non-limiting embodiment shown and described herein, includes a first segment 232, a second segment 234, and a number of coupling mechanisms 236,238, although it will be appreciated that it could have three or more segments (not shown), without departing from the scope of the disclosed concept. The first segment 232, which in the example shown and described herein is a first half 232 of the separate ring member 220, is structured to extend around (shown in FIG. 4) or within (not shown) a first portion of the perimeter 402 of the work piece 400. The second segment 234, which in the example shown and described herein is a second half 234 of the separate ring member 220, is structured to extend around (shown in FIG. 4) or within (not shown) a second portion of the perimeter 402 of the work piece 400, generally opposite from the first portion. The coupling mechanisms 236,238 couple the first and second segments 232,234 together, as shown. For simplicity of illustration and economy of disclosure, only one coupling mechanism 238 will be described herein, in detail. It will be appreciated that the other coupling mechanisms (see coupling mechanism 236; see also coupling mechanisms 276 and 278 coupling the segments of segmented base ring 104 in FIG. 3) are preferably although not necessarily substantially similar. Specifically, the exemplary coupling mechanism 238 includes a first block element 240, a second block element 242, a number of first fastening mechanisms 244, a number of second fastening mechanisms 246, and a number of third fastening mechanisms 248. The number of first fastening mechanisms 244 fasten the first block element 240 to the second side 224 of the first segment 232 of the separate ring member 220, as shown. Similarly, the number of second fastening mechanisms 246 fasten the second block element 242 to the second side 224 of the second segment 234 of the separate ring member 220. Finally, the number of third fastening mechanisms 248 fasten the first block element 240 to the second block element 242.

Figure 12:
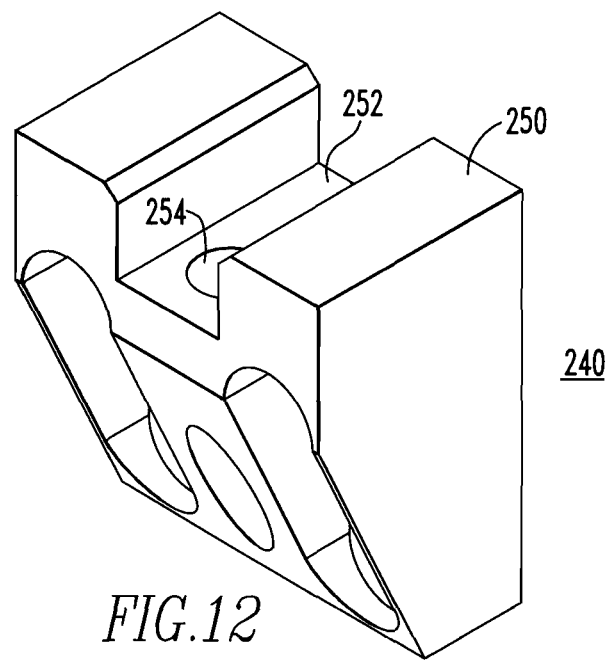
FIG. 12 is an isometric view of a first block element for a coupling mechanism of the pipe lathe.
Figure 13:
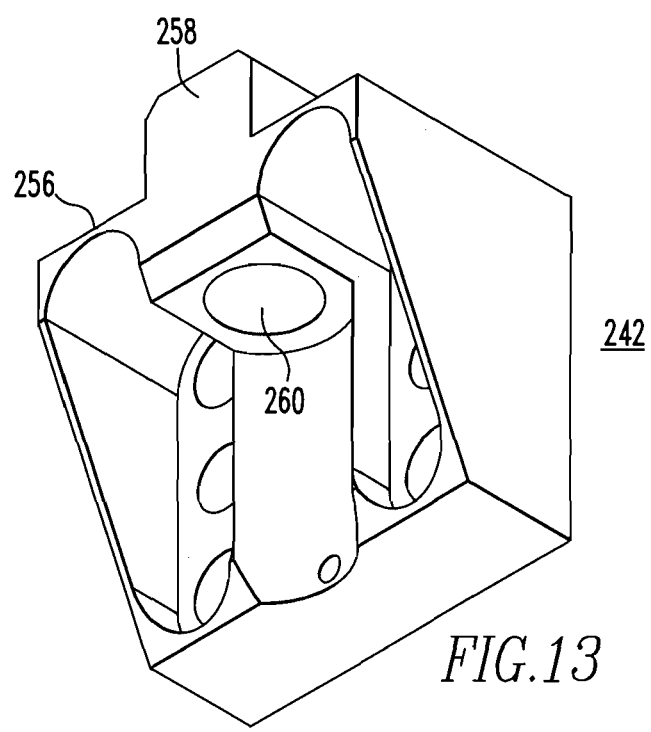
FIG. 13 is an isometric view of a second block element for the coupling mechanism of the pipe lathe.
Figure 14:
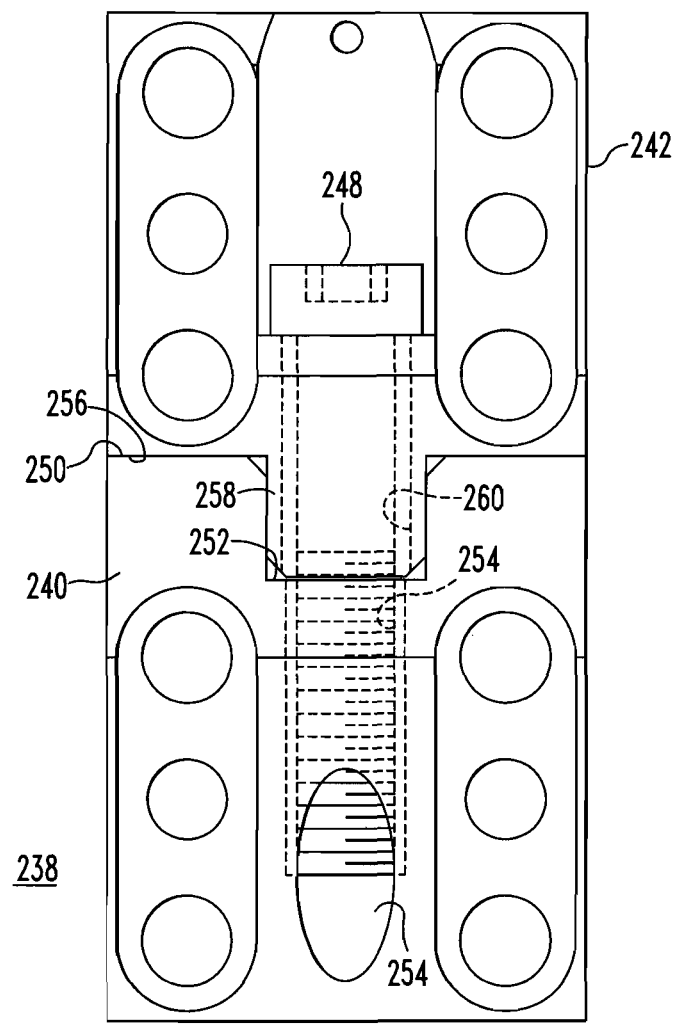
FIG. 14 is a top plan view of the coupling mechanism for the pipe lathe, showing the first block element of FIG. 12 and the second block element of FIG. 13 assembled.

The exemplary block elements 240 (FIG. 12), 242 (FIG. 13) of the exemplary coupling mechanism 238 (FIG. 14) are best shown in FIGS. 12-14. Specifically, in the embodiment shown, which is provided for purposes of illustration only and is not intended to limit the scope of the disclosed concept in any manner, the first block element 240, includes a first edge 250, a recess 252 extending inwardly from the first edge 250, and a first hole 254 extending through the first edge 250. The second block element 242 includes a second edge 256, a protrusion 258 extending outwardly from the second edge 256, and a second hole 260, which extends through the second edge 256, as best shown in FIG. 13. When the first segment 232 of the separate ring member 220 is coupled to the second segment 234 of the separate ring member 220, as shown in FIGS. 3 and 4, the protrusion 258 of the second block element 242 is disposed in the recess 252 of the first block element 240, and the first aperture 254 of the first block element 240 aligns with the second aperture 260 of the second block element 242, as best shown in FIG. 14. A corresponding one of the number of third fastening mechanisms 248 extends through the first aperture 254, into the second aperture 260, in order to fasten the first block element 240 to the second block element 242. It will, however, be appreciated that any known or suitable alternative number, type and/or configuration of suitable coupling mechanisms (not shown) could be employed, without departing from the scope of the disclosed concept.

Figure 2:
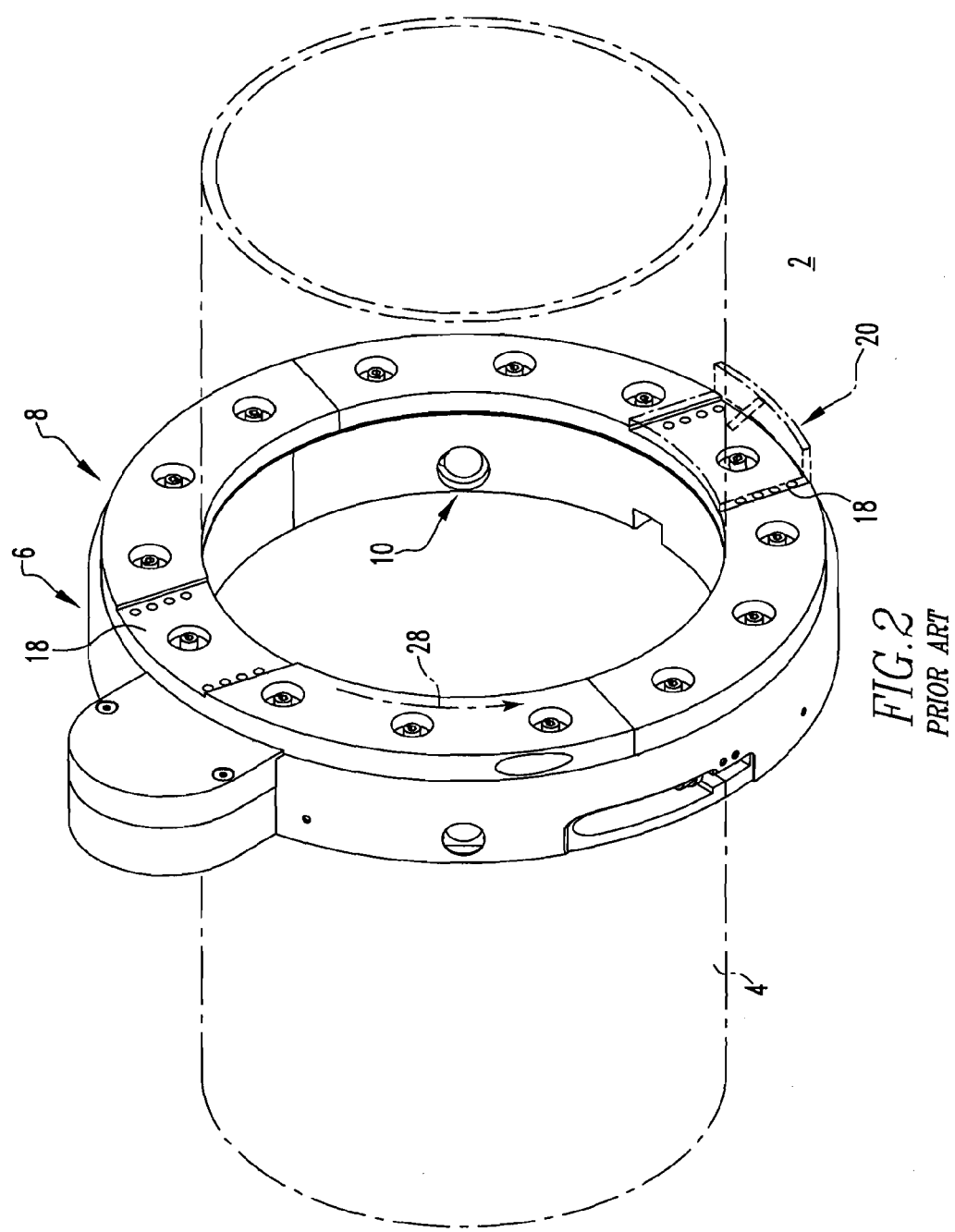
FIG. 2 is an isometric assembled view of the prior art pipe lathe of FIG. 1.

Accordingly, it will be appreciated that unlike the generally relatively large, heavy and complex single-piece monolithic movable gear rings of conventional pipe lathes (see, for example, gear ring 12 of pipe lathe 2 of FIGS. 1 and 2), the disclosed subassembly 200 provides gear ring 210 and separate ring member 220, which is separate and subsequently fastened to the gear ring 210, as previously described. In this manner, a modular system is provided, which reduces weight and makes it possible to change (e.g., without limitation, repair; exchange; upgrade) or adjust the pipe lathe 102, relatively quickly and easily. For example and without limitation, the gear ring 210 and/or separate ring member 220 can be changed (e.g., switched) with another suitable replacement or exchange component to suitably modify the pipe lathe 102 for a particular, different machining and/or work piece application. Additionally, because the gear ring 210 is separate, it is easier and less expensive to replace, for example, if/when the teeth 218 (FIGS. 3, 6A and 6B) become damaged or worn.

In the example shown and described herein, the plurality of apertures 226 of the separate ring member 220 is a plurality of bolt holes 226 arranged in a predetermined pattern generally equidistant about the circumference of the separate ring member 220, as shown in FIGS. 3, 4 and 5A. The gear ring 210 includes a plurality of corresponding bolt receiving apertures 270, as shown in FIGS. 3 and 6A. The bolt receiving apertures 270 extend inwardly from the second side 216 of the gear ring 210 and align with the bolt holes 226 of the separate ring member 220 to receive bolts 231 (FIGS. 3 and 4). In this manner, the separate ring member 220 is secured to the second side 216 of the gear ring 210.

The separate ring member 220 has a first thickness 272 measured by the distance between the first and second sides 222,224 of the separate ring member 220, as shown in FIG. 5B, and the gear ring 210 has a second thickness 274 measured by the distance between the first and second sides 212,216 of the gear ring 210, as shown in FIG. 6B. The first thickness 272 of the separate ring member 220 is preferably less than the second thickness 274 of the gear ring 210. In one non-limiting example, the first thickness 272 of the separate ring member 220 is about 0.5 inch to about 1.0 inch. It will, however, be appreciated that any known or suitable alternative first thickness 272 could be employed, without departing from the scope of the disclosed concept.

For ease of illustration and economy of disclosure, only one tool mounting portion 228 will be described, in detail, herein. Specifically, in the non-limiting example shown, for example, in FIGS. 5A and 5B, the tool mounting portion 228 includes a recessed portion 262 (best shown in the side elevation view of FIG. 5B), which extends inwardly from the second side 224 of the separate ring member 220, and includes a plurality of mounting holes 264 (FIG. 5A). It will be appreciated, however, that such a recessed portion 262 is not required. That is, in an alternative embodiment in accordance with the disclosed concept, the mounting portion 228 may not be recessed such that the tooling assembly 500 is coupled directly to outer surface of the second side 224 of the separate ring member 220. The mounting holes 264 are structured to receive corresponding fasteners 268 as shown, for example and without limitation, in FIG. 4. The example tool mounting portion 230 further includes an adjustable mounting assembly 266 (commonly referred to as a tool slide), which is fastened to the recessed portion 262 of the tool mounting portion 230 by the fasteners 268 (see also FIGS. 3 and 5A). The adjustable mounting assembly 266, in turn, movably mounts a tool holder 502 that secures the desired tool 504 of the tool assembly 500. In the non-limiting example of FIG. 4 the tool is a cutting tool 504, which is shown in simplified form in phantom line drawing. The mounting assembly (tool slide) 266 functions to suitably adjust (e.g., without limitation, advance inwardly) the tool holder 502 and cutting tool 504 secured therein into a desired relationship with respect to the work piece 400 (e.g., without limitation, pipe). Thus, when the drive gear assembly 106 of the pipe lathe 102 rotates the subassembly 200 about the perimeter 402 of the work piece 400, as previously described, the tool assembly 500 performs the desired machining operation (e.g., without limitation, cutting operation) on the work piece 400. It will be appreciated that the pipe lathe 102 could include any known or suitable number, type and/or configuration of tool assemblies (e.g., 500).

Figure 11A:
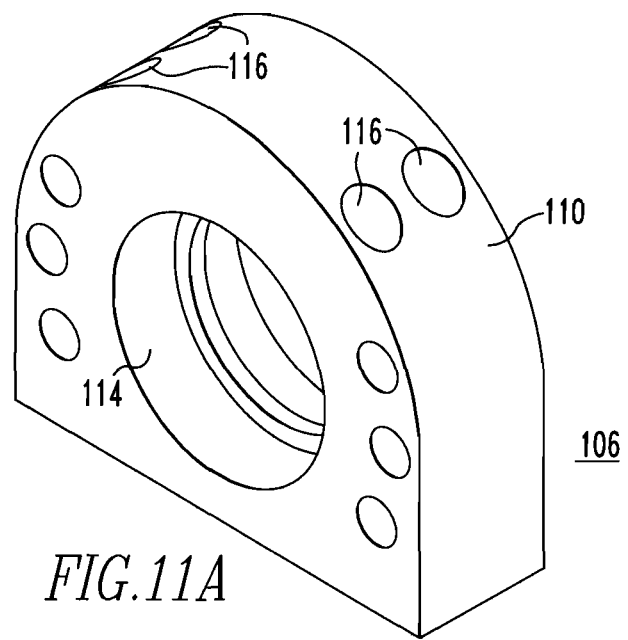
FIG. 11A is an isometric view of a portion of the drive gear assembly of the pipe lathe.
Figure 11B:
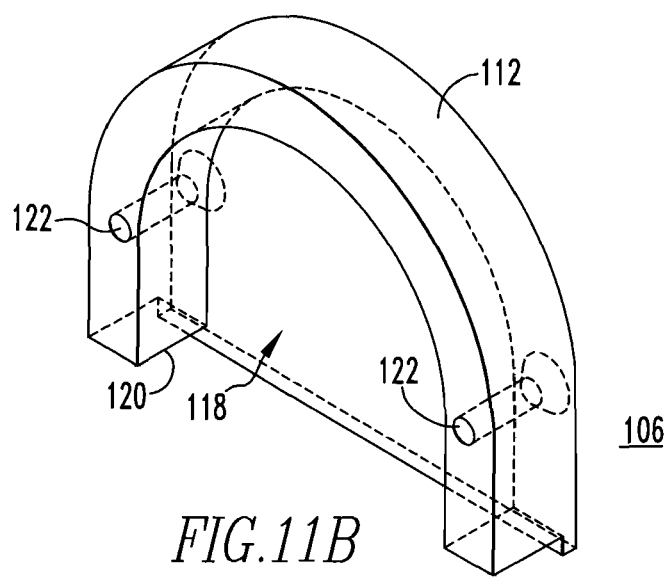
FIG. 11B is an isometric view of a cover for the drive gear assembly of FIG. 11A.

The drive gear assembly 106, which drives (e.g., without limitation, rotates) the disclosed subassembly 200 with respect to the base ring 104, is best shown in the exploded view of FIG. 3. Specifically, the drive gear assembly 106 includes a base 110 (also shown in FIG. 11A) having an aperture 114 for receiving the aforementioned drive gear 119. The base 110 also includes a plurality of mounting holes 116. A cover 112 (also shown in FIG. 11B) overlays the base 110 and defines a cavity 118 for receiving the drive gear 119. The cover 112 is fastened to the base 110 by a number of fasteners 123 inserted through holes 122 in the cover 112 and secured to the base 110. When the cover 112 is fastened over the drive gear 119 to the base 110, an open end portion 120 is defined, whereby the teeth of the drive gear 119 can cooperate with the teeth 218 of the gear ring 210. The base 110 of the drive gear assembly 106 is fastened to the base ring 104 by a plurality of fasteners 117 inserted through the aforementioned mounting holes 116 of the base 110. In the example shown and described herein, the base ring 104 includes a number of generally planar portions 128 (FIGS. 3, 4, 7A, 7C, 9A and 9B), 130 (FIGS. 3, 8A, 8C, 10A and 10B) each of which is structured to be capable of receiving a corresponding drive assembly 106. It will, however, be appreciated that any known or suitable alternative number, type and/or configuration of drive assemblies (not shown) could be employed to suitably cooperate with the gear ring 210 to drive (e.g., without limitation, rotate) the subassembly 200 about the work piece 400 (FIG. 4) and perform a machining operation thereon, as desired.

Features of the segmented base ring 104 of the exemplary pipe lathe 102 are further shown in FIGS. 8A-10C, which respectively show different views and corresponding portions of the base ring 104, some of which are shown in hidden line drawing and section view. For example and without limitation, the segmented base ring 104 may, but need not necessarily, further include a spacer ring 126 and an enclosure 160, as shown in FIG. 3. The optional spacer ring 126 in the non-limiting example shown and described herein is disposed within an annular recess 124 (shown in hidden line drawing in FIGS. 9A and 10A) between the base ring 104 and the first side 212 of the gear ring 210 of the subassembly 200. For example and without limitation, the optional spacer ring 126 may be made from a material (e.g., without limitation, steel), which is harder than the material (e.g., without limitation, aluminum) of the base ring 104, such that it functions, at least in part, to protect the base ring 104. It will, however, be appreciated that the components of the pipe lathe 102 can be made from any known or suitable material or combination of materials, without departing from the scope of the disclosed concept.

The annular recess 124 of the segmented base ring 104 includes a plurality of shaft apertures 136, and the spacer ring 126 includes a plurality of through holes 138. As shown in FIG. 3, each of the aforementioned bearing assemblies 108 of the pipe lathe 102 includes a shaft 132 and a bearing 134 pivotably disposed on the shaft 132. The shaft 132 of each of the bearing assemblies 108 extends outwardly from a corresponding one of the shaft apertures 136 of the segmented base ring 104, and through one of the through holes 138 of the spacer ring 126. The bearing 134 of each of the bearing assemblies 108 is disposed within the bearing slot 214 (partially shown in hidden line drawing in FIG. 3; see also FIG. 6B) on the first side 212 of the gear ring 210 of the subassembly 200. In this manner, the base ring 104 is movably coupled to the subassembly 200. That is, the bearing assemblies 108 function both to secure the base ring 104 to the subassembly 200 and, in particular, to the gear ring 210 thereof, and also to permit rotation of the gear ring 210 and the remainder of the subassembly 200 with respect to the base ring 104. Finally, when the subassembly 200 is assembled to the base ring 104, as shown in FIG. 4, the cover 160 of the base ring 104 overlays the bearing assemblies 108 and gear ring 210 to resist undesired access and/or entry of debris.

Accordingly, the disclosed subassembly 200 forms a modular system that includes relatively thin and light components, namely the gear ring 210 and separate ring member 220, wherein one or both of these components can be relatively quickly and easily switched, for example, by removing and replacing the aforementioned bolts 231 (FIGS. 3 and 4). In addition to the aforementioned benefits, the subassembly structure also enables the separate ring member 220 to be replaced, for example and without limitation, with another ring member (not shown) of similar or different properties (e.g., without limitation, different type (e.g., harder; softer) of material; different dimension; different configuration), and/or for a wide variety of different tool mounting features and/or configurations to be provided for a particular work piece and/or a particular desired machining operation.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

The invention claimed is:

1. A pipe lathe for machining a work piece, said work piece having a perimeter, said pipe lathe comprising:
   a segmented base ring structured to be removably coupled to said work piece;
   a drive gear assembly coupled to said segmented base ring;
   a plurality of bearing assemblies; and
   a subassembly comprising:
      a gear ring including a first side having a bearing slot, a second side disposed opposite the first side, and a plurality of teeth, said bearing slot receiving at least a portion of each of said bearing assemblies, wherein said teeth of said gear ring cooperate with said drive gear assembly to rotate said subassembly about the perimeter of said work piece;
      a separate ring member comprising a first side facing the second side of said gear ring, a second side disposed opposite the first side of said separate ring member, said separate ring member structured to be fastened to said gear ring such that said separate ring member rotates with said gear ring but not independently with respect thereto;
      at least one tool mounting portion disposed on the second side of said separate ring member, said at least one tool mounting portion being structured to mount a number of tool assemblies for machining said work piece; and
   wherein said separate ring member of said subassembly further comprises a plurality of segments and number of coupling mechanisms; wherein each of said segments is structured to extend around or within a corresponding portion of the perimeter of said work piece; and
   wherein said coupling mechanisms couple said segments together.

2. The pipe lathe of claim 1 wherein each of said coupling mechanisms of said subassembly includes a first block element, a second block element, a number of first fastening mechanisms, a number of second fastening mechanisms, and a number of third fastening mechanisms; wherein said number of first fastening mechanisms fasten said first block element to the second side of a first one of said segments of said separate ring member; wherein said number of second fastening mechanisms fasten said second block element to the second side of a second one of said segments of said separate ring member; and wherein said number of third fastening mechanisms fasten said first block element to said second block element.

3. The pipe lathe of claim 2 wherein said first block element comprises a first edge, a recess extending inwardly from the first edge, and a first hole extending through the first edge; wherein said second block element comprises a second edge, a protrusion extending outwardly from the second edge, and a second hole extending through the second edge; wherein, when said first segment of said separate ring member is coupled to said second segment of said separate ring member, the protrusion of said second block element is disposed in the recess of said first block element; wherein a first aperture of said first block element aligns with the second aperture of said second block element; and wherein a corresponding one of said number of third fastening mechanisms extends through the first aperture into the second aperture in order to fasten said first block element to said second block element.

4. The pipe lathe of claim 1 wherein said at least one tool mounting portion of said subassembly is a first tool mounting portion disposed on a first one of said segments of said separate ring member, and a second tool mounting portion disposed on a second different one of said segments of said separate ring member; and wherein each of said first tool mounting portion and said second tool mounting portion comprises a recessed portion extending inwardly from the second side of said separate ring member and including a plurality of mounting holes.

5. The pipe lathe of claim 4 wherein at least one of said first tool mounting portion and said second tool mounting portion further comprises an adjustable mounting assembly; wherein said adjustable mounting assembly is fastened to said recessed portion by a plurality of fasteners structured to engage said mounting holes; wherein said adjustable mounting assembly is structured to mount a corresponding one of said tool assemblies and adjust said corresponding one of said tool assemblies into a desired relationship with respect to said work piece; and wherein, when said drive gear assembly of said pipe lathe rotates said subassembly about the perimeter of said work piece, said corresponding one of said tool assemblies performs a desired machining operation on said work piece.

6. The pipe lathe of claim 1 wherein said segmented base ring comprises an annular recess and a spacer ring; and wherein said spacer ring is disposed in said annular recess between said segmented base ring and the first side of said gear ring of said subassembly.

7. The pipe lathe of claim 6 wherein each of said bearing assemblies includes a shaft and a gear pivotably disposed on said shaft; wherein said annular recess of said segmented base ring includes a plurality of shaft apertures; wherein said spacer ring includes a plurality of through holes; wherein the shaft of each of said bearing assemblies extends outwardly from a corresponding one of said shaft apertures of said segmented base ring through one of said through holes of said spacer ring; and wherein the gear of each of said bearing assemblies is disposed within said bearing slot on the first side of said gear ring of said subassembly.

8. A pipe lathe for machining a work piece, said work piece having a perimeter, said pipe lathe comprising:
   a segmented base ring structured to be removably coupled to said work piece;
   a drive gear assembly coupled to said segmented base ring;
   a plurality of bearing assemblies; and
   a subassembly comprising:
      a gear ring including a first side having a bearing slot, a second side disposed opposite the first side, and a plurality of teeth, said bearing slot receiving at least a portion of each of said bearing assemblies, wherein said teeth of said gear ring cooperate with said drive gear assembly to rotate said subassembly about the perimeter of said work piece;
      a separate ring member comprising a first side facing the second side of said gear ring, a second side disposed opposite the first side of said separate ring member, said separate ring member structured to be fastened to said gear ring such that said separate ring member rotates with said gear ring but not independently with respect thereto;
      at least one tool mounting portion disposed on the second side of said separate ring member, said at least one tool mounting portion being structured to mount a number of tool assemblies for machining said work piece; and wherein said segmented base ring comprises an annular recess and a spacer ring;

and wherein said spacer ring is disposed in said annular recess between said segmented base ring and the first side of said gear ring of said subassembly.

9. The pipe lathe of claim 8 wherein each of said bearing assemblies includes a shaft and a gear pivotably disposed on said shaft; wherein said annular recess of said segmented base ring includes a plurality of shaft apertures; wherein said spacer ring includes a plurality of through holes; wherein the shaft of each of said bearing assemblies extends outwardly from a corresponding one of said shaft apertures of said segmented base ring through one of said through holes of said spacer ring; and wherein the gear of each of said bearing assemblies is disposed within said bearing slot on the first side of said gear ring of said subassembly.

10. The pipe lathe of claim 8 wherein said separate ring member of said subassembly further comprises a plurality of segments and number of coupling mechanisms; wherein each of said segments is structured to extend around or within a corresponding portion of the perimeter of said work piece; and wherein said coupling mechanisms couple said segments together.

11. The pipe lathe of claim 10 wherein each of said coupling mechanisms of said subassembly includes a first block element, a second block element, a number of first fastening mechanisms, a number of second fastening mechanisms, and a number of third fastening mechanisms; wherein said number of first fastening mechanisms fasten said first block element to the second side of a first one of said segments of said separate ring member; wherein said number of second fastening mechanisms fasten said second block element to the second side of a second one of said segments of said separate ring member; and wherein said number of third fastening mechanisms fasten said first block element to said second block element.

12. The pipe lathe of claim 11 wherein said first block element comprises a first edge, a recess extending inwardly from the first edge, and a first hole extending through the first edge; wherein said second block element comprises a second edge, a protrusion extending outwardly from the second edge, and a second hole extending through the second edge; wherein, when said first segment of said separate ring member is coupled to said second segment of said separate ring member, the protrusion of said second block element is disposed in the recess of said first block element; wherein a first aperture of said first block element aligns with the second aperture of said second block element; and wherein a corresponding one of said number of third fastening mechanisms extends through the first aperture into the second aperture in order to fasten said first block element to said second block element.

13. The pipe lathe of claim 10 wherein said at least one tool mounting portion of said subassembly is a first tool mounting portion disposed on a first one of said segments of said separate ring member, and a second tool mounting portion disposed on a second different one said segments of said separate ring member; and wherein each of said first tool mounting portion and said second tool mounting portion comprises a recessed portion extending inwardly from the second side of said separate ring member and including a plurality of mounting holes.

14. The pipe lathe of claim 13 wherein at least one of said first tool mounting portion and said second tool mounting portion further comprises an adjustable mounting assembly; wherein said adjustable mounting assembly is fastened to said recessed portion by a plurality of fasteners structured to engage said mounting holes; wherein said adjustable mounting assembly is structured to mount a corresponding one of said tool assemblies and adjust said corresponding one of said tool assemblies into a desired relationship with respect to said work piece; and wherein, when said drive gear assembly of said pipe lathe rotates said subassembly about the perimeter of said work piece, said corresponding one of said tool assemblies performs a desired machining operation on said work piece.

* * * * *